Patented Nov. 12, 1935

2,020,689

UNITED STATES PATENT OFFICE 2,020,689

PROCESS FOR THE PREPARATION OF ALIPHATIC CARBOXYLIC ACIDS

Alfred T. Larson, Wilmington, Del., assignor to E. I. du Pont de Nemours & Company, Wilmington, Del., a corporation of Delaware No Drawing. Application October 25, 1932, Serial No. 639,482

6 Claims. (Cl. 260—116)

This invention relates to the synthesis of organic compounds and particularly to the preparation of higher aliphatic acids by the interaction of olefines, carbon monoxide, and steam.

In the patent of Gilbert B. Carpenter 1,924,766, a process is described for the preparation of aliphatic carboxylic acids of the higher order by the reaction of steam, carbon monoxide, and an olefinic hydrocarbon, i. e., an aliphatic hydrocarbon containing a double bond,—for example, the olefines ethylene, propylene, butylene, etc.,—the synthesis producing from these olefines propionic, butyric, and valeric acids respectively. The acid produced contains one more carbon atom than the unsaturated hydrocarbon treated.

An object of the present invention is to provide a process for the preparation of aliphatic carboxylic acids from steam, carbon monoxide, and olefinic hydrocarbons. A further object of this invention is to provide a process for the preparation of monocarboxylic acids from steam, carbon monoxide and an olefine in the presence of a halogenated aliphatic or aromatic hydrocarbon, such as propyl chloride, benzyl chloride, etc., with or without the presence of an absorbent material such as pumice, silica gel, active carbon, etc. Another object of the invention is to provide a process for the preparation of acids having the structural formula—

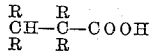

from steam, carbon monoxide, and an olefinic hydrocarbon, the R indicating hydrogen or a substituted or unsubstituted similar or dissimilar alkyl or aralkyl grouping. Other objects and advantages will hereinafter appear.

In accord with this invention aliphatic carboxylic acids can be prepared from steam, carbon monoxide, and an olefinic hydrocarbon by passing these constituents in the presence of a saturated or unsaturated halogenated hydrocarbon, under suitable pressure and temperature conditions, over active carbon, and more particularly over activated charcoal. The products resulting from such a reaction will contain generally a mixture of aliphatic carboxylic acids some of which have a greater, some a lesser, number of carbon atoms than are present in the olefine treated,—an aliphatic acid containing one more carbon atom than the olefine, usually predominating.

The halogenated hydrocarbons which are suitable for activating the reaction include the halides of methane,—that is the mono-, di-, and trichlorides, bromides, or iodides of methane, the carbon tetrahalides being included as, for example, carbon tetrachloride; the halogenated derivatives of the higher hydrocarbons and including more particularly the ethyl halides, the normal and iso-propyl halides, the butyl halides, including such compounds as the 1-iodo and 2-iodo-butane, and the 2-methyl-iodo and 2-methyl-2-iodo propane as well as the other halides of these compounds; the ethylene, the ethylidine and propylene halides; tri-chlor-hydrin, perchloroethane, and the unsaturated halogenated hydrocarbons, more particularly the allyl chlorides and bromides, and similar halides such as vinyl halide, alpha-halogenated propylene, trichlorethylene, acetylene tetrachloride, and homologous compounds. Any of the halogenated hydrocarbons, whether saturated or unsaturated, are suitable as catalysts for this reaction, particularly when used in conjunction with a form of active carbon.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity.

The carbon monoxide required for the synthesis may conveniently be derived from various commercial sources, such as, for example, water-gas, producer gas, etc., by liquefaction or other methods, and should be likewise, for the best results, relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied although it has been found that very advantageous results are obtained when the steam and carbon monoxide are in excess with respect to the olefinic hydrocarbon. Concentrations of the latter within the range of from 1½ to 10% by volume of the total reactants have been employed with good results.

The use of pressures in excess of atmospheric, say from 25 to 900 atmospheres, is preferred. The reaction proceeds over a wide range of temperatures although the optimum temperature varies with specific cases, depending inter alia upon the hydrocarbon being used. Generally the desired reaction can be obtained at from 200° to 400° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° to 375° C.

The following examples will illustrate methods of practicing the invention, altho the invention is not limited to the examples.

*Example 1.*—A gaseous mixture is prepared containing by volume 95% carbon monoxide, and 5% ethylene, together with steam to give a steam : carbon monoxide and ethylene ratio of approximately 0.25; into this mixture is injected sufficient carbon tetrachloride to give a resulting gaseous mixture containing 0.125 per cent. of this gaseous catalyst. The resulting gaseous mixture is passed into a conversion chamber designed for carrying out exothermic gaseous reactions and in which activated charcoal is disposed. The temperature of the reaction is maintained at approximately 325° C. while the pressure is held at approximately 700 atmospheres. A 67% yield of propionic acid may be obtained together with other aliphatic acids when operating under these conditions.

*Example 2.*—In lieu of injecting carbon tetrachloride into the reaction an amount of ethylene dichloride is injected to give approximately 0.92% concentration in the resulting mixture. Gas compositions, pressure, and temperature conditions were substantially equivalent to those employed in Example 1. A good yield of propionic acid is obtained together with other aliphatic acids.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, copper, manganese, or nickel.

Various changes may be made in the method hereinbefore described without departing from the invention or sacrificing the advantages thereof.

I claim:

1. A process for the preparation of aliphatic carboxylic acids from steam, carbon monoxide, and an olefinic hydrocarbon which includes the step of effecting the reaction in the presence of carbon tetrachloride and active carbon.

2. A process for the preparation of aliphatic carboxylic acids from a gaseous mixture containing steam, carbon monoxide, and an olefinic hydrocarbon which includes the step of effecting the reaction by passing the gaseous mixture together with carbon tetrachloride over activated charcoal.

3. A process for the preparation of propionic acid from steam, carbon monoxide, and ethylene which includes the step of effecting the reaction in the presence of carbon tetrachloride, and active carbon.

4. A process for the preparation of propionic acid which comprises reacting a gaseous mixture containing, in approximately the percentages given, 95% carbon monoxide and 5% ethylene in the presence of 0.125% carbon tetrachloride, with a ratio of steam to gaseous mixture of 0.25, the reaction being conducted at a temperature and pressure of approximately 325° C. and 700 atmospheres, respectively.

5. A process for the preparation of butyric acid from steam, carbon monoxide, and propylene which includes the step of effecting the reaction in the presence of carbon tetrachloride, and active carbon.

6. A process for the preparation of valeric acid from steam, carbon monoxide, and butylene which includes the step of effecting the reaction in the presence of carbon tetrachloride, and active carbon.

ALFRED T. LARSON.